United States Patent
Cageao et al.

(10) Patent No.: US 10,851,198 B2
(45) Date of Patent: *Dec. 1, 2020

(54) PROCESSES FOR PRODUCING FILTER CARTRIDGE ASSEMBLIES AND MOLDED POLYURETHANE ELASTOMERS

(71) Applicant: Covestro LLC, Pittsburgh, PA (US)

(72) Inventors: Ronald A. Cageao, Beaver, PA (US); Merle W. Lesko, McDonald, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,695

(22) Filed: Nov. 15, 2019

(65) Prior Publication Data

US 2020/0087441 A1 Mar. 19, 2020

Related U.S. Application Data

(62) Division of application No. 15/834,127, filed on Dec. 7, 2017, now Pat. No. 10,519,273.

(51) Int. Cl.

| | |
|---|---|
| *C08G 18/76* | (2006.01) |
| *C08G 18/10* | (2006.01) |
| *C08G 18/48* | (2006.01) |
| *B29C 67/24* | (2006.01) |
| *B01D 35/30* | (2006.01) |
| *C02F 1/00* | (2006.01) |
| *B01D 29/01* | (2006.01) |
| *C08G 18/50* | (2006.01) |
| *B29K 105/00* | (2006.01) |
| *B29K 75/00* | (2006.01) |
| *B29L 31/14* | (2006.01) |
| *C02F 103/42* | (2006.01) |

(52) U.S. Cl.
CPC ....... *C08G 18/7664* (2013.01); *B01D 29/016* (2013.01); *B01D 35/30* (2013.01); *B29C 67/246* (2013.01); *C02F 1/001* (2013.01); *C08G 18/10* (2013.01); *C08G 18/482* (2013.01); *C08G 18/4808* (2013.01); *C08G 18/4816* (2013.01); *C08G 18/4825* (2013.01); *C08G 18/4829* (2013.01); *C08G 18/5021* (2013.01); *B01D 2201/12* (2013.01); *B29K 2075/00* (2013.01); *B29K 2105/0005* (2013.01); *B29L 2031/14* (2013.01); *C02F 2103/42* (2013.01)

(58) Field of Classification Search
None
See application file for complete search history.

(56) References Cited

U.S. PATENT DOCUMENTS

| | | |
|---|---|---|
| 3,988,244 A | 10/1976 | Brooks |
| 4,108,775 A | 8/1978 | Wilkes et al. |
| 4,201,847 A | 5/1980 | Kleimann et al. |
| 4,499,038 A | 2/1985 | Schäfer et al. |
| 4,774,264 A | 9/1988 | Weber et al. |
| 4,792,576 A | 12/1988 | Nodelman |
| 4,868,224 A | 9/1989 | Harasin et al. |
| 4,889,908 A | 12/1989 | Franke et al. |
| 4,954,537 A | 9/1990 | Sanns, Jr. |
| 4,983,643 A | 1/1991 | Sanna, Jr. |
| 5,019,317 A | 5/1991 | Slocum et al. |
| 5,125,973 A | 6/1992 | Mafoti |
| 5,125,974 A | 6/1992 | Mafoti |
| 5,128,087 A | 7/1992 | Slocum et al. |
| 5,137,966 A | 8/1992 | Nodelman |
| 5,158,607 A | 10/1992 | Mafoti et al. |
| 5,160,538 A | 11/1992 | Mafoti |
| 5,208,268 A | 5/1993 | Mafoti |
| 5,211,846 A | 5/1993 | Kott et al. |
| 5,324,773 A | 6/1994 | Mafoti et al. |
| 5,344,853 A | 9/1994 | Knipp et al. |
| 5,389,696 A | 2/1995 | Dempsey et al. |
| 5,500,176 A | 3/1996 | Parks et al. |
| 5,529,739 A | 6/1996 | Jonsson et al. |
| 5,668,239 A | 9/1997 | Nodelman et al. |
| 5,739,253 A | 4/1998 | Nodelman et al. |
| 6,057,416 A | 5/2000 | Nodelman et al. |
| 6,448,364 B1 | 9/2002 | Clatty et al. |
| 6,471,905 B1 | 10/2002 | Haas et al. |
| 6,552,153 B1 | 4/2003 | Kaufhold et al. |
| 7,087,657 B2 | 8/2006 | Haas et al. |
| 2007/0241045 A1 | 10/2007 | Kott et al. |
| 2007/0259981 A1 | 11/2007 | Eling et al. |

FOREIGN PATENT DOCUMENTS

| | | |
|---|---|---|
| GB | 1151592 | 5/1969 |
| NZ | 545812 A | 9/2006 |
| WO | 2016148914 A1 | 9/2016 |
| WO | 2016162097 A1 | 10/2016 |

*Primary Examiner* — Peter L Vajda
*Assistant Examiner* — Adrianna N Konves
(74) *Attorney, Agent, or Firm* — Donald R. Palladino

(57) ABSTRACT

Disclosed are processes for producing molded polyurethane elastomers and products, such as filter end caps, that include such elastomers. The elastomers are the reaction product of a non-foaming reaction mixture comprising an isocyanate-reactive composition and an organic polyisocyanate prepolymer with an internal mold release agent.

9 Claims, No Drawings

PROCESSES FOR PRODUCING FILTER CARTRIDGE ASSEMBLIES AND MOLDED POLYURETHANE ELASTOMERS

CROSS-REFERENCE TO RELATED APPLICATION

This application is a divisional of U.S. patent application Ser. No. 15/834,127, filed Dec. 7, 2017, which is incorporated herein by reference.

FIELD

The present invention relates to processes for producing filter cartridge assemblies that include a molded polyurethane elastomer end-cap, as well as to methods for making molded polyurethane elastomers.

BACKGROUND

Filter cartridge assemblies, such as those used to filter water in swimming pool and spa applications, are often constructed of a body, which is often cylindrical (although other shapes are also possible). The body comprises a filter medium. To produce the filter cartridge assembly, end-caps are affixed at opposite ends of the body. These end-caps are sometimes affixed to the filter medium by immersing the filter medium into a polyurethane reaction mixture that will harden about the end of the filter medium to form an elastomeric end-cap. The polyurethane reaction mixture is placed in a mold so that, when it hardens, the end-cap has the desired shape. To be suitable as a filter end-cap, especially for filters used in swimming pool and spa applications, the resulting polyurethane elastomer should have excellent impact resistance, tear strength, suitable hardness, sometimes exhibiting a Shore D hardness of at least about 80, and be resistant to chemicals to which the filter cartridge assembly will be exposed.

One of the drawbacks of the foregoing molding process to produce such filter cartridge assemblies is that external mold release agents are used to produce the assembly. This mold release agent, typically a silicone material, is applied to the mold so that the filter cartridge assembly can be removed from the mold relatively easily and with little or no damage to the end-cap. The external mold release agent, however, is, depending on the shape of the mold, either wiped on the mold or sprayed onto the mold to access harder to reach areas. These processes are labor intensive and, in the case of spray application of the mold release agent, undesirable due to the presence of solvents in the silicone spray. Internal mold release agents in a polyurethane reaction mixture can, however, reduce the reactivity of the reaction mixture and increase the time it takes for the polyurethane elastomer to achieve a green strength sufficient for the end-cap to be demolded without damage, thereby reducing productivity.

As a result, it would be desirable to provide processes for producing molded polyurethane elastomers that can be an end-cap of a filter cartridge assembly utilizing isocyanates with an internal mold release agent, thereby eliminating the need to apply an external mold release agent to the mold prior to production of each, or nearly each, filter end-cap. It would be desirable that such processes still provide a filter end-cap exhibiting required physical properties, such as hardness sufficient for use with filters used in swimming pool and spa applications, all without negatively impacting manufacturing productivity.

SUMMARY

In certain respects, the present specification is directed to processes of making a filter cartridge assembly comprising an end member and a body comprising a filter medium. These processes comprise affixing the end member to an end of the body, wherein the end member is a polyurethane elastomer that is a reaction product of a non-foaming reaction mixture comprising an isocyanate-reactive composition and an organic polyisocyanate prepolymer having an internal mold release agent, wherein the isocyanate-reactive composition comprises 1% to 10% by weight, based on the total weight of isocyanate-reactive ingredients in the isocyanate-reactive composition, of a polyether tetrol that is an alkylene diamine-alkylene oxide adduct having a number average molecular weight of 150 to 500 gram/mole.

In other respects, the present specification is directed to processes for producing a molded polyurethane elastomer. These processes comprise depositing a non-foaming reaction mixture into a mold, the non-foaming reaction mixture comprising: (a) an organic polyisocyanate prepolymer having an internal mold release agent; and (b) an isocyanate-reactive composition comprising: (i) 1% to 10% by weight, based on the total weight of isocyanate-reactive ingredients in the isocyanate-reactive composition, of a polyether tetrol that is an alkylene diamine-alkylene oxide adduct having a number average molecular weight of 150 to 500 gram/mole; (ii) a polyether polyol prepared from an initiator which is not an amine that has a hydroxyl functionality greater than 2 and a number average molecular weight of 150 to 500 gram/mole; and (iii) 40 to 80 percent by weight, based on the total weight of the isocyanate-reactive composition, of a polyether polyol having a functionality of 3 and a number average molecular weight of 600 to 800 gram/mole. In these processes, the polyether tetrol (i) and the polyether polyol prepared from an initiator which is not an amine (ii) are present in the isocyanate-reactive composition in a relative weight ratio of 2:1 to 4:1.

In yet other respects, the present specification is directed to processes of making a filter cartridge assembly comprising an end member and a body comprising a filter medium, comprising affixing the end member to an end of the body. In these processes, the end member is a polyurethane elastomer that is a reaction product of a non-foaming reaction mixture comprising an isocyanate-reactive composition and an organic polyisocyanate prepolymer having an internal mold release agent, wherein the isocyanate-reactive composition comprises a mixture of polyols formulated to provide a polyurethane elastomer having a Shore D hardness, measured according to ASTM D2240-15, within 10 minutes after production that is at least 60% of the Shore D hardness of the polyurethane elastomer measured 16 hours after production.

The present specification is also directed to, among other things, molded polyurethane elastomers produced from processes of the present specification and products, including, but not limited to, filter end-caps and filter cartridge assemblies, produced by processes described in this specification.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, certain embodiments of the present specification are directed to processes for producing a molded polyurethane elastomer. The elastomer is, in some embodiments, embodied as an end-cap affixed to an end of a body of a filter cartridge assembly, the body comprising a filter medium. The filter cartridge assembly is, in certain embodiments, used for filtering a liquid, such as water, and, in some embodiments, is employed in an aquatic application, such as swimming pools and spas, and the like. In certain embodiments, the filter medium is a pleated material, such as, for example, a spun bonded polyester, polypropylene or cotton though other filter medium can be employed if desired. The filter cartridge assembly, and the body, in certain embodiments, has a generally cylindrical structure and the end-caps, in certain embodiments, are generally circular. One example of a filter cartridge assembly encompassed by the present specification is described in U.S. Pat. No. 5,211,846 at col. 4, line 4 to col. 11, line 42, the cited portion of which being incorporated herein by reference.

The processes of the present specification comprise depositing a non-foaming reaction mixture into a mold. One suitable technique of depositing the reaction mixture into the mold is a one-shot technique in which an isocyanate functional component and an isocyanate-reactive composition are separately supplied to a mixhead, where they are mixed, and the mixture is then injecting into a mold. One-shot processes are disclosed in U.S. Pat. Nos. 5,668,239 and 5,739,253, for example. The filter cartridge assembly can be produced by immersing an end, or both ends, of the filter medium into a non-foaming reaction mixture that is deposited in a mold and the reaction mixture hardens about the end(s) of the filter medium to thereby affix the end member to an end of the body.

As indicated, certain processes of the present specification comprise depositing a non-foaming reaction mixture into a mold. As used herein, "non-foaming reaction mixture" means that the reaction mixture does not form a foam when reacted. As used herein, the term "foam" refers to a substance that is formed by trapping pockets of gas in a liquid or solid. As such, the reaction mixtures used in certain processes of the present specification are substantially free of any blowing agent. As used herein, the term "substantially free", when used with reference to the absence of blowing agent in the reaction mixture, means that there is insufficient blowing agent in the reaction mixture to result in the production of a foam when the reaction mixture is reacted. Examples of such blowing agents are water and readily volatile organic substances, including hydrofluorocarbons, perfluorinated hydrocarbons, polyfluoroalkenes, and hydrocarbons, such as isomers of butane, pentane, cyclopentane, hexane, heptane or diethylether, among others. In certain embodiments, the reaction mixture does not include any intentionally added blowing agent, or, in some cases, does not include any blowing agent at all.

In certain embodiments of the processes of the present specification, the non-foaming reaction mixture comprises an organic polyisocyanate prepolymer with an internal mold release agent. Suitable such polyisocyanate prepolymers include, but are not necessarily limited to, the reaction products of fatty acid esters and organic polyisocyanates.

Suitable fatty acid esters include, without limitation, those in which at least one aliphatic acid which contains more than 8 carbon atoms is built into the molecule and which have acid numbers of between 0 and 100, such as between 0 and 40, and hydroxyl numbers between 0 and 150, such as between 0 and 75, with at least one of the acid number and hydroxyl number being greater than 0.

Suitable fatty acid esters include polyesters or mixed esters prepared both from monofunctional and from polyfunctional carboxylic acids and/or alcohols, including fatty acid esters prepared from several different types of fatty acids or carboxylic acids and/or alcohols so that complicated fatty acid esters with a number average molecular weight of, for example, 500 to 5000 grams/mole, such as 800 to 3000 grams/mole, are obtained.

Amines or amino alcohols may also be used in the preparation of the fatty acid esters to produce fatty acid mixed esters which contain basic or amide groups, which are suitable for use in the processes of the present specification. Such mixed esters can be obtained, for example, by adding ammonia, monoalkylamines or dialkylamines or their alkoxylation products, for example with ethylene oxide, propylene oxide or higher epoxides or by using acid amides which contain carboxyl groups or alcohol groups. These acid amides may be obtained, for example, by the amidation of carboxylic acids with monoalkanolamines or dialkanolamines such as ethanolamine, diethanolamine, propanolamine, or dipropanolamine, among others.

In some embodiments, the fatty acid esters used for the reaction with the polyisocyanates are prepared by esterifying carboxylic acids with alcohols. Suitable alcohols include, but are not limited to, butanol, hexanol, octanol-isomers, dodecanol, oleyl alcohol, natural or synthetic steroid alcohols, ethylene glycol, propylene glycol, butanediols, hexanediols, glycerol, trimethylolpropane, pentaerythritol, sorbitol, hexitol, various sugars, as well as addition products of alkylene oxides, such as ethylene oxide or propylene oxide, with these alcohols, and the like, including mixtures of any of the foregoing. In some cases, the alcohol comprises glycerol, trimethylolpropane, pentaerythritol, sorbitol, or any mixture of any two or more thereof.

The carboxylic acids used may be saturated or unsaturated and are, in some cases, aliphatic, for example octane carboxylic acids, dodecane acids, natural fatty acids, such as ricinoleic acid, oleic acid, elaidic acid, stearic acid, palmitic acid, linoleic acid, linolenic acid acid, train oil fatty acids, fatty acids obtained from coconut oil, tallow fatty acids or fatty acids obtained by paraffin oxidation, tall oil fatty acids, succinic acid, maleic acid, citric acid, azelaic acid, adipic acid or higher dicarboxylic and polycarboxylic acids, oligomerisation products of unsaturated carboxylic acids and addition products of maleic acid with natural and synthetic oils, and the like. In some cases, the carboxylic acid comprises oleic acid, linoleic acid, ricinoleic acid, adipic acid, or a mixture of any two or more thereof.

In some cases, the fatty acid esters are prepared by cocondensation of the alcohols and acids at a temperatures above 100° C., such as 120° to 180° C., optionally in a vacuum, the process of the elimination of water being continued until the desired hydroxyl and acid numbers or average molecular weights have been obtained. The process of esterification may, if desired, be catalyzed with acid or basic catalysts and the water may be eliminated by azeotropic distillation. The products prepared may contain hydroxyl and/or carboxylic acid groups.

In certain embodiments, the fatty acid ester used is a condensate of oleic acid with a dicarboxylic acid, such as adipic acid, and a polyfunctional alcohol, such as pentaerythritol, that has a number average molecular weight of 900 to 2500 gram/mole, a hydroxyl number of 30 to 70 mg KOH/gram, and/or an acid number of 3 to 30 determined according to DIN EN ISO 2114 (June 2002).

Any of a variety of organic polyisocyanates, including aliphatic, cycloaliphatic, araliphatic, aromatic and/or heterocyclic polyisocyanates, may be used for the reaction with the fatty acid ester to make the organic polyisocyanate prepolymer with an internal mold release agent suitable for use in processes of the present specification. Specific examples of which include, but are not limited to, ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, hexahydrotolylene-2,4-diisocyanate, hexahydrotolylene-2,6-diisocyanate, hexahydrophenylene-1,3-diisocyanate, hexahydrophenylene-1,4-diisocyanate, perhydrodiphenylmethane-1,4'-diisocyanate, perhydrodiphenylmethane-4,4'-diisocyanate, phenylene-1,3-diisocyanate, phenylene-1,4-diisocyanate, tolylene-2,4-diisocyanate, tolylene-2,6-diisocyanate, diphenylmethane-2,4'-diisocyanate, diphenylmethane-4,4'-diisocyanate, naphthylene-1,5-diisocyanate, triphenylmethane-4, 4',4"-triisocyanate, polyphenyl-polymethylene polyisocyanates obtained by aniline-formaldehyde condensation followed by phosgenation, polyisocyanates which contain carbodiimide groups, polyisocyanates which contain allophanate groups, polyisocyanates which contain isocyanurate groups, polyisocyanates which contain urethane groups, polyisocyanates which contain acylated urea groups, polyisocyanates which contain biuret groups, polyisocyanates which contain ester groups, and any mixtures of two or more of any of the foregoing.

Reaction of the fatty acid ester or mixtures of fatty acid esters with the polyisocyanates can be carried out by mixing the fatty acid ester with the polyisocyanate and reacting the components at temperatures of, for example, 30° C. to 200° C., such as 45° C. to 95° C., with stirring.

The molar ratio of active hydrogen atoms to isocyanate groups in the reaction of the fatty acid ester with the polyisocyanate is, in certain embodiments, from 1:1 to 1:25. In certain embodiments, a mixture of 0.5 to 50% by weight, such as 1 to 35% by weight, of fatty acid esters and 99.5 to 50% by weight, such as 99 to 65% by weight of polyisocyanate (the weight percents being based on the total weight of fatty acid ester and polyisocyanate) are reacted at a temperature of 30° C. to 200° C. In certain embodiments, the quantity of fatty acid ester used is from 0.5 to 25% by weight, such as 2 to 18% by weight, based on the total weight of polyisocyanate.

As illustrated in the Examples below, the extent of mold release performance in a non-foam elastomer, when using such polyisocyanate prepolymers that are the reaction product of a fatty acid ester and organic polyisocyanates, was far greater than expected.

As previously indicated, in the processes of the present specification, the non-foaming reaction mixture comprises an isocyanate-reactive composition. As used herein, the term "isocyanate-reactive composition" refers to a composition comprising one or more ingredients with functional groups reactive with isocyanate groups, examples of such groups being amine groups, thiol groups, and hydroxyl groups. In the processes of the present specification, the isocyanate-reactive composition comprises one or more polyols.

More particularly, a critical aspect of the isocyanate-reactive composition used in the processes of the present specification is the use of an isocyanate-reactive composition comprising 1% to 10% by weight, based on the total weight of isocyanate-reactive ingredients in the isocyanate-reactive composition, of a polyether tetrol that is an alkylene diamine-alkylene oxide adduct having a number average molecular weight of 150 to 500 gram/mole, such as 300 to 400 gram/mole, or 340 to 380 gram/mole, such as those having a hydroxyl number of 600 to 660 mg KOH/g. In fact, as illustrated in the Examples, it was discovered that the presence of such an adduct, in the right amount, was essential to provide an elastomer having sufficient hardness as well as an adequate cure profile to maintain manufacturing productivity. In certain embodiments of the processes of the present specification, the foregoing adduct is present in an amount of 2% to 6% by weight, based on the total weight of isocyanate-reactive ingredients in the isocyanate-reactive composition.

Alkylene diamines suitable for use in preparing the foregoing adduct include those of the formula:

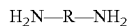

where R is a $C_2$ to $C_8$ straight or branched chain alkylene group. Specific examples of suitable diamines include ethylene diamine and the various straight and branched chain isomers of diaminopropane, diaminobutane, diaminopentane, diaminohexane, diaminoheptane, and diaminooctane. Specific examples include 1,2- and 1,3-diaminopropane, 1,3-, 2,3-, and 1,4-diaminobutane, 1,2-diamino-2-methyl propane, 1,5-diaminopentane, 1,4-diamino-1-methylbutane, 1,4-diamino-2-methylbutane, 1,3-diamino-1-ethylpropane, 1,3-diamino-1,1-dimethylpropane, 1,3-diamino-1,2-dimethylpropane, 1,3-diamino-2,2-dimethylpropane, 1,5-diamino-2-methylpentane, and/or 1,6-diaminohexane. The adducts useful herein can be prepared by reacting one or more of the above noted diamines with one or more alkylene oxides, such as ethylene oxide and/or propylene oxide. Suitable adducts can be prepared by reacting one mole of the diamine with from 4 to 12 moles, such as 4 to 6 moles, or 4 or 5 moles, of the alkylene oxide.

In certain embodiments of the processes of the present specification, the isocyanate-reactive composition further comprises a polyether polyol prepared from an initiator which is not an amine (e.g., any of the known hydroxyl group-containing starters) that has a hydroxyl functionality of greater than 2, such as 3 or more, such as 3 to 4, or 3, and a number average molecular weight of 150 to 500 gram/mole, such as 150 to 450 gram/mole, such as 240 to 300 gram/mole, such as those having a functionality of 3 and a hydroxyl number of 350 to 660 mg KOH/g, such as 600 to 660 mg KOH/g or 640 to 660 mg KOH/g.

In some embodiments of the processes of the present specification, the polyether polyol prepared from an initiator which is not an amine (A) and the alkylene diamine-alkylene oxide adduct (B) are present in the isocyanate-reactive composition in a relative ratio, by weight of (A):(B), of at least 1:1, such as at least 2:1 or, in some cases, 2:1 to 4:1. In addition, in some embodiments, the combined weight of the polyether polyol prepared from an initiator which is not an amine described above and the alkylene diamine-alkylene oxide adduct described above in the isocyanate-reactive composition is at least 10 percent by weight, such as 10 to 20 percent by weight, based on the total weight of the isocyanate-reactive composition.

In addition, in some embodiments of the processes of the present specification, the isocyanate-reactive composition further comprises a polyether polyol having a hydroxyl functionality of at least 2, sometimes greater than 2 and a number average molecular weight of from above 500 gram/mole to below 2000 gram/mole or from 600 gram/mole to 800 gram/mole. In certain embodiments, such polyether polyols are the reaction product of one or more alkylene oxides and an aliphatic diol and/or triol, optionally in combination with pentaerythritol, water, and mixtures of two or more of any of the foregoing. Suitable aliphatic triols include, but are not limited to, trimethylolethane, trimethylolpropane, triethylolpropane, 1,2,6-hexane triol, and mixtures of two or more of any of the foregoing. Suitable aliphatic diols include, but are not limited to, ethylene glycol, propylene glycol, 1,3-butylene glycol, 1,4-butylene glycol, 2,3-butylene glycol, glycerol, and mixtures of two or more of any of the foregoing. Suitable alkylene oxides include, but are not limited to, ethylene oxide, propylene oxide, butylene oxide, and mixtures of two or more of any of the foregoing.

In certain embodiments, the foregoing polyether polyol having a hydroxyl functionality of at least 2, such as greater than 2, and a number average molecular weight of from above 500 to below 2000 gram/mole, is present in an amount of 40 to 80 percent by weight, such as 50 to 70 percent by weight, based on the total weight of the isocyanate-reactive composition. In certain embodiments, the isocyanate-reactive composition comprises a blend of polyols that comprises (i) 60 to 90% by weight, such as 70 to 90% by weight, such as 75 to 85% by weight, of polyol(s) having a hydroxyl functionality of at least 2, such as greater than 2, and a number average molecular weight of from above 500 to below 2000 gram/mole; (ii) 10 to 40% by weight, such as 15 to 25% by weight, of polyol(s) having a hydroxyl functionality of greater than 2 and a number average molecular weight of 150 to 500 gram/mole, such weight percents being based on the total weight of polyols in the isocyanate-reactive composition.

It was discovered that merely replacing the organic polyisocyanate prepolymer with an organic polyisocyanate prepolymer having an internal mold release agent, without modifying the components of the isocyanate-reactive composition, could not satisfy the objective of eliminating the need to apply an external mold release agent to the mold prior to production of each, or nearly each elastomer, such as a filter end-cap, while still providing filter end-caps exhibiting required physical properties, such as hardness sufficient for use with filters used in swimming pool and spa applications, all without negatively impacting manufacturing productivity. In particular, in order to solve such a problem in the processes of the present specification, it was discovered that to provide a polyurethane elastomer having a Shore D hardness measured within 10 minutes after production that is at least 60% of the Shore D hardness of the polyurethane elastomer measured 16 hours after production, more particularly in some cases, wherein the elastomer has a Shore D hardness of at least 80 measured 16 hours after production and the Shore D hardness within 10 minutes after production is at least 80% of the Shore D hardness of the polyurethane elastomer measured 16 hours after production, it was critical to use an isocyanate-reactive composition comprising 1% to 10% by weight, such as 2% to 6% by weight, based on the total weight of isocyanate-reactive ingredients in the isocyanate-reactive composition, of a polyether tetrol that is an alkylene diamine-alkylene oxide adduct having a number average molecular weight of 150 to 500 gram/mole, such as 300 to 400 gram/mole, or 340 to 380 gram/mole, such as those having a hydroxyl number of 600 to 660 mg KOH/g. The Shore D hardness values reported herein are determined according to ASTM D2240-15.

Moreover, as indicated earlier, in some cases it is desired to provide such compositions that can produce a molded polyurethane elastomer exhibiting a final Shore D hardness (16 hours after production) of at least 80 or more. As a result, embodiments of the present disclosure are also directed to producing such elastomers by depositing a non-foaming reaction mixture into a mold, the non-foaming reaction mixture comprising: (a) an organic polyisocyanate prepolymer having an internal mold release agent; and (b) an isocyanate-reactive composition comprising: (i) 1% to 10% by weight, based on the total weight of isocyanate-reactive ingredients in the isocyanate-reactive composition, of a polyether tetrol that is an alkylene diamine-alkylene oxide adduct having a number average molecular weight of 150 to 500 gram/mole; (ii) a polyether polyol prepared from an initiator which is not an amine that has a hydroxyl functionality greater than 2 and a number average molecular weight of 150 to 500 gram/mole; and (iii) 40 to 80 percent by weight, based on the total weight of the isocyanate-reactive composition, of a polyether polyol having a functionality of 3 and a number average molecular weight of 600 to 800 gram/mole, wherein the polyether tetrol (i) and the polyether polyol prepared from an initiator which is not an amine (ii) are present in the isocyanate-reactive composition in a relative weight ratio of 2:1 to 4:1.

Furthermore, in some embodiments, the isocyanate-reactive composition has an average hydroxyl number of greater than 500, in some cases greater than 550, or greater than 600, and no more than 1000, no more than 800 or no more than 700. In some embodiments, the isocyanate-reactive composition comprises less than 0.1% by weight, such as less than 0.05% by weight, or 0% by weight, of carboxylic acid. In certain embodiments, the isocyanate-reactive composition comprises less than 0.5% by weight, such as less than 0.1% by weight, or 0% by weight, of zinc carboxylate, such as a zinc carboxylate containing from 8 to 24 carbon atoms per carboxylate group. In certain embodiments, the isocyanate-reactive composition comprises less than 2% by weight, such as less than 1% by weight, or 0% by weight, of fatty acid. In certain embodiments, the reaction mixture comprises less than 0.5% by weight, such as less than 0.1% by weight, or 0% by weight, of a peralkylated polyalkylene polyamine. In certain embodiments, the isocyanate-reactive composition does not include a polyether having at least two isocyanate-reactive groups and a molecular weight of 1800 to 12,000 in which at least 50% of the isocyanate-reactive groups are primary amine and/or secondary amino groups. In certain embodiments, the isocyanate-reactive composition comprises less than 5% by weight, such as less than 1% by weight, or 0% by weight, of a chain extender comprising a sterically hindered aromatic diamine.

Other suitable isocyanate-reactive compositions may be used, depending on the desired physical properties of the resulting elastomer. One suitable alternative isocyanate-reactive composition is set forth in the Examples (see Example 6).

With respect to any polyols described herein that are polymers, all molecular weight values are number average molecular weights, unless otherwise noted. Such number average molecular weights are determined by gel-permeation chromatography (GPC) using a method based on DIN 55672-1 employing chloroform as the eluent with a mixed bed column (Agilent PL Gel; SDVB; 3 micron Pore dia: 1×Mixed-E+5 micron Pore dia: 2×Mixed-D), refractive index (RI) detection and calibrated with polyethylene glycol. The viscosity of any polyols described herein is determined using an Anton-Paar SVM 3000 viscometer at 25° C. that has been demonstrated to give equivalent results as can be generated with ASTM-D4878-15, calibrating the instrument using mineral oil reference standards of known viscosity. The hydroxyl number of any polyols described herein is determined according to ASTM D4274-11 and is reported in mg [KOH]/g [polyol].

In addition to the isocyanate-reactive components, the isocyanate-reactive composition may comprise other ingredients, such as fillers, colorants, catalysts, surface-active additives, rheology modifiers, moisture scavengers, including mixtures of any two or more thereof. Suitable fillers include talc, calcium carbonate, barium sulfate, fumed or precipitated silica, quartz flour, diatomaceous earth, alumina trihydrate, titanium dioxide, and mixtures of two or more of any of the foregoing. In some embodiments, the filler is present in an amount of 5 to 50% by weight, such as 10 to 40% by weight or 15 to 30% by weight, based on the total weight of the isocyanate-reactive composition.

In certain embodiments, the isocyanate-reactive composition does not include an internal mold release agent.

Suitable catalysts include, for example, tertiary amines, such as triethylamine, tributylamine, N-methylmorpholine, N-ethylmorpholine, N-cocomorpholine, N,N,N',N''-tetramethylethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butane diamine, N,N-dimethyl-phenylethylamine, 1,2-dimethylimidazole and 2-methylimidazole. Organometallic compounds, such as organotin compounds, may also be used as catalysts, specific examples of which include tin-(II)-salts of carboxylic acids, such as tin-(II)-acetate, tin-(II)-octoate, tin-(II)-ethylhexoate and tin-(II)-laurate and the dialkyl tin salts of carboxylic acids, such as dibutyl tin diacetate, dibutyl tin dilaurate, dibutyl tin maleate or dioctyl tin diacetate. These polyurethane catalysts are generally included in the isocyanate-reactive composition in an amount of from 0.01 to 5 parts by weight, such as from 0.02 to 1 parts by weight, based on total weight of the polyol in the isocyanate-reactive composition.

As indicated earlier, some embodiments of the processes of the present specification comprise depositing a non-foaming reaction mixture into a mold by mixing an isocyanate functional component as described herein and an isocyanate-reactive composition and injecting the mixture into a mold. In some embodiments, the isocyanate functional component and the isocyanate-reactive composition are mixed at an isocyanate index of from 90 to 140, such as 100 to 120.

The reaction mixtures and processes described herein can be particularly suitable for producing filter cartridge assemblies. As a result, some embodiments of the processes of the present specification are directed to making a filter cartridge assembly. These processes comprise affixing an end member to at least one end of a body comprising a filter medium, wherein the end member is a polyurethane elastomer that is the reaction product of a non-foaming reaction mixture comprising an isocyanate-reactive composition and an organic polyisocyanate prepolymer with an internal mold release agent, such as any of the reaction mixtures described above in this specification. The filter cartridge assembly can be produced by immersing an end, or both ends, of the filter medium into a non-foaming reaction mixture that is deposited in a mold wherein the reaction mixture hardens about the end(s) of the filter medium to form the end cap(s). These processes of the present invention, in certain embodiments, do not include the use of an external mold release agent applied to the mold surfaces.

Various aspects of the subject matter described in this specification are set out in the following embodiments:

Embodiment 1. A process of making a filter cartridge assembly comprising an end member and a body comprising a filter medium, comprising affixing the end member to an end of the body, wherein the end member is a polyurethane elastomer that is a reaction product of a non-foaming reaction mixture comprising an isocyanate-reactive composition and an organic polyisocyanate prepolymer having an internal mold release agent, wherein the isocyanate-reactive composition comprises 1% to 10% by weight, based on the total weight of isocyanate-reactive ingredients in the isocyanate-reactive composition, of a polyether tetrol that is an alkylene diamine-alkylene oxide adduct having a number average molecular weight of 150 to 500 gram/mole.

Embodiment 2. The process of Embodiment 1, wherein the filter medium is a pleated material, such as a spun bonded polyester, polypropylene or cotton.

Embodiment 3. The process of one or more of Embodiment 1 to Embodiment 2, wherein the body has a generally cylindrical structure and/or the end member is generally circular.

Embodiment 4. The process of one or more of Embodiment 1 to Embodiment 3, wherein the affixing comprises depositing the non-foaming reaction mixture into a mold, such as by a one-shot technique in which the organic polyisocyanate prepolymer and the isocyanate-reactive composition are separately supplied to a mixhead, where they are mixed, and the mixture is then injected into a mold and an end of the filter medium is immersed into the non-foaming reaction mixture that is deposited in the mold until the reaction mixture hardens about the end of the filter medium.

Embodiment 5. The process of one or more of Embodiment 1 to Embodiment 4, wherein the organic polyisocyanate prepolymer with an internal mold release agent comprises a reaction product of a fatty acid ester and an organic polyisocyanate, such as a fatty acid ester in which at least one aliphatic acid which contains more than 8 carbon atoms is built into the molecule and which has an acid number of between 0 and 100, such as between 0 and 40, and a hydroxyl number between 0 and 150, such as between 0 and 75, with at least one of the acid number and hydroxyl number being greater than 0.

Embodiment 6. The process of Embodiment 5, wherein the fatty acid ester has a number average molecular weight of 500 to 5000 grams/mole, such as 800 to 3000 grams/mole.

Embodiment 7. The process of one or more of Embodiment 5 to Embodiment 6, wherein the fatty acid ester is a condensate of oleic acid with a dicarboxylic acid, such as adipic acid, and a polyfunctional alcohol, such as pentaerythritol, and has a number average molecular weight of 900 to 2500 gram/mole, a hydroxyl number of 30 to 70 mg KOH/gram, and/or an acid number of 3 to 30 determined according to DIN EN ISO 2114 (June 2002).

Embodiment 8. The process of one or more of Embodiment 5 to Embodiment 7, wherein the organic polyisocyanate used for the reaction with the fatty acid ester to make the organic polyisocyanate prepolymer with an internal mold release agent comprises ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, hexahydrotolylene-2,4-diisocyanate, hexahydrotolylene-2,6-diisocyanate, hexahydrophenylene-1,3-diisocyanate, hexahydrophenylene-1,4-diisocyanate, perhydrodiphenylmethane-1,4'-diisocyanate, perhydrodiphenylmethane-4,4'-diisocyanate, phenylene-1,3-diisocyanate, phenylene-1,4-diisocyanate, tolylene-2,4-diisocyanate, tolylene-2,6-diisocyanate, diphenylmethane-2,4'-diisocyanate, diphenylmethane-4,4'-diisocyanate, naphthylene-1,5-diisocyanate, triphenylmethane-4,4',4"-triisocyanate, a polyphenyl-polymethylene polyisocyanate obtained by aniline-formaldehyde condensation followed by phosgenation, a polyisocyanate which contains carbodiimide groups, a polyisocyanate which contains allophanate groups, a polyisocyanate which contains isocyanurate groups, a polyisocyanate which contains urethane groups, a polyisocyanate which contains acylated urea groups, a polyisocyanate which contains biuret groups, a polyisocyanate which contains ester groups; or any mixture of two or more of any of the foregoing.

Embodiment 9. The process of one or more of Embodiment 5 to Embodiment 8, wherein fatty acid ester and the polyisocyanate are reacted in amounts such that the molar ratio of active hydrogen atoms to isocyanate groups is from 1:1 to 1:25.

Embodiment 10. The process of one or more of Embodiment 5 to Embodiment 9, wherein a mixture of 0.5 to 50% by weight, such as 1 to 35% by weight, of fatty acid ester and 99.5 to 50% by weight, such as 99 to 65% by weight, of polyisocyanate (the weight percents being based on the total weight of fatty acid ester and polyisocyanate) are reacted, such as where the quantity of fatty acid ester used is from 0.5 to 25% by weight, such as 2 to 18% by weight, based on the total weight of polyisocyanate.

Embodiment 11. The process of one or more of Embodiment 1 to Embodiment 10, wherein the alkylene diamine-alkylene oxide adduct has a number average molecular weight of 300 to 400 gram/mole, such as 340 to 380 gram/mole, and/or has a hydroxyl number of 600 to 660 mg KOH/g.

Embodiment 12. The process of one or more of Embodiment 1 to Embodiment 11, wherein the alkylene diamine-alkylene oxide adduct is present in an amount of 2% to 6% by weight, based on the total weight of isocyanate-reactive ingredients in the isocyanate-reactive composition.

Embodiment 13. The process of one or more of Embodiment 1 to Embodiment 12, wherein the alkylene diamine used to prepare the alkylene diamine-alkylene oxide adduct comprises ethylene diamine.

Embodiment 14. The process of one or more of Embodiment 1 to Embodiment 13, wherein the alkylene oxide used to prepare the alkylene diamine-alkylene oxide adduct comprises ethylene oxide and/or propylene oxide.

Embodiment 15. The process of one or more of Embodiment 1 to Embodiment 14, wherein the alkylene diamine-alkylene oxide adduct is a reaction product of one mole of the diamine with from 4 to 12 moles, such as 4 to 6 moles, or 4 or 5 moles, of the alkylene oxide.

Embodiment 16. The process of one or more of Embodiment 1 to Embodiment 15, wherein the isocyanate-reactive composition further comprises a polyether polyol prepared from an initiator which is not an amine that has a hydroxyl functionality of greater than 2, such as 3 or more, such as 3 to 4, or 3, and a number average molecular weight of 150 to 500 gram/mole, such as 150 to 450 gram/mole, such as 240 to 300 gram/mole, such as those having a functionality of 3 and a hydroxyl number of 350 to 660 mg KOH/g, such as 600 to 660 mg KOH/g or 640 to 660 mg KOH/g.

Embodiment 17. The process of Embodiment 16, wherein the polyether polyol prepared from an initiator which is not an amine (A) and the alkylene diamine-alkylene oxide adduct (B) are present in the isocyanate-reactive composition in a relative ratio, by weight of (A):(B), of at least 1:1, such as at least 2:1 or, in some cases, 2:1 to 4:1.

Embodiment 18. The process of one or more of Embodiment 16 or Embodiment 17, wherein the combined weight of the polyether polyol prepared from an initiator which is not an amine and the alkylene diamine-alkylene oxide adduct in the isocyanate-reactive composition is at least 10 percent by weight, such as 10 to 20 percent by weight, based on the total weight of the isocyanate-reactive composition.

Embodiment 19. The process of one or more of Embodiment 1 to Embodiment 18, wherein the isocyanate-reactive composition further comprises a polyether polyol having a hydroxyl functionality of at least 2, such as greater than 2, and a number average molecular weight of from above 500 gram/mole to below 2000 gram/mole, such as from 600 gram/mole to 800 gram/mole.

Embodiment 20. The process of Embodiment 19, wherein the polyether polyol having a hydroxyl functionality of at least 2 and a number average molecular weight of from above 500 to below 2000 gram/mole is present in an amount of 40 to 80 percent by weight, such as 50 to 70 percent by weight, based on the total weight of the isocyanate-reactive composition.

Embodiment 21. The process of one or more of Embodiment 1 to Embodiment 20, wherein the isocyanate-reactive composition comprises a blend of polyols that comprises (i) 60 to 90% by weight, such as 70 to 90% by weight, such as 75 to 85% by weight, of polyol(s) having a hydroxyl functionality of at least 2, such as greater than 2, and a number average molecular weight of from above 500 to below 2000 gram/mole; and (ii) 10 to 40% by weight, such as 15 to 25% by weight, of polyol(s) having a hydroxyl functionality of greater than 2 and a number average molecular weight of 150 to 500 gram/mole, such weight percents being based on the total weight of polyols in the isocyanate-reactive composition.

Embodiment 22. The process of one or more of Embodiment 1 to Embodiment 21, wherein the polyurethane elastomer has a Shore D hardness measured within 10 minutes after production that is at least 60% of the Shore D hardness of the polyurethane elastomer measured 16 hours after production, such as where the elastomer has a Shore D hardness of at least 80 measured 16 hours after production and the Shore D hardness within 10 minutes after production is at least 80% of the Shore D hardness of the polyurethane elastomer measured 16 hours after production.

Embodiment 23. The process of one or more of Embodiment 1 to Embodiment 22, wherein the isocyanate-reactive composition has an average hydroxyl number of greater than 500, in some cases greater than 550, or greater than 600, and no more than 1000, no more than 800 or no more than 700.

Embodiment 24. The process of one or more of Embodiment 1 to Embodiment 23, wherein the isocyanate-reactive composition comprises less than 0.1% by weight, such as less than 0.05% by weight, or 0% by weight, of carboxylic acid.

Embodiment 25. The process of one or more of Embodiment 1 to Embodiment 24, wherein the isocyanate-reactive composition comprises less than 0.5% by weight, such as less than 0.1% by weight, or 0% by weight, of zinc carboxylate, such as a zinc carboxylate containing from 8 to 24 carbon atoms per carboxylate group.

Embodiment 26. The process of one or more of Embodiment 1 to Embodiment 25, wherein the isocyanate-reactive composition comprises less than 2% by weight, such as less than 1% by weight, or 0% by weight, of fatty acid.

Embodiment 27. The process of one or more of Embodiment 1 to Embodiment 26, wherein the reaction mixture comprises less than 0.5% by weight, such as less than 0.1% by weight, or 0% by weight, of a peralkylated polyalkylene polyamine.

Embodiment 28. The process of one or more of Embodiment 1 to Embodiment 27, wherein the isocyanate-reactive composition does not include a polyether having at least two isocyanate-reactive groups and a molecular weight of 1800 to 12,000 in which at least 50% of the isocyanate-reactive groups are primary amine and/or secondary amino groups.

Embodiment 29. The process of one or more of Embodiment 1 to Embodiment 28, wherein the isocyanate-reactive composition comprises less than 5% by weight, such as less than 1% by weight, or 0% by weight, of a chain extender comprising a sterically hindered aromatic diamine.

Embodiment 30. The process of one or more of Embodiment 1 to Embodiment 29, wherein the isocyanate-reactive composition comprises a filler, such as talc, calcium carbonate, barium sulfate, fumed or precipitated silica, quartz flour, diatomaceous earth, alumina trihydrate, titanium dioxide, and mixtures of two or more of any of the foregoing, such as any of these where the filler is present in an amount of 5 to 50% by weight, such as 10 to 40% by weight or 15 to 30% by weight, based on the total weight of the isocyanate-reactive composition.

Embodiment 31. The process of one or more of Embodiment 1 to Embodiment 30, wherein the isocyanate-reactive composition does not include an internal mold release agent.

Embodiment 32. The process of one or more of Embodiment 1 to Embodiment 31, wherein the isocyanate-reactive composition further comprises a catalyst, such as a tertiary amine, such as triethylamine, tributylamine, N-methylmorpholine, N-ethylmorpholine, N-cocomorpholine, N,N,N',N''-tetramethylethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butane diamine, N,N-dimethyl-phenylethylamine, 1,2-dimethylimidazole and/or 2-methylimidazole, and/or an organometallic compound, such as an organotin compound, such as tin-(II)-salts of carboxylic acids, such as tin-(II)-acetate, tin-(II)-octoate, tin-(II)-ethylhexoate and tin-(II)-laurate and the dialkyl tin salts of carboxylic acids, such as dibutyl tin diacetate, dibutyl tin dilaurate, dibutyl tin maleate or dioctyl tin diacetate, including where the catalyst is included in the isocyanate-reactive composition in an amount of from 0.01 to 5 parts by weight, such as from 0.02 to 1 parts by weight, based on total weight of the polyol in the isocyanate-reactive composition.

Embodiment 33. The process of one or more of Embodiment 1 to Embodiment 32 wherein the isocyanate functional component and the isocyanate-reactive composition are mixed at an isocyanate index of from 90 to 140, such as 100 to 120.

Embodiment 34. A process for producing a molded polyurethane elastomer, comprising depositing a non-foaming reaction mixture into a mold, the non-foaming reaction mixture comprising: (a) an organic polyisocyanate prepolymer having an internal mold release agent; and (b) an isocyanate-reactive composition comprising: (i) 1% to 10% by weight, based on the total weight of isocyanate-reactive ingredients in the isocyanate-reactive composition, of a polyether tetrol that is an alkylene diamine-alkylene oxide adduct having a number average molecular weight of 150 to 500 gram/mole; (ii) a polyether polyol prepared from an initiator which is not an amine that has a hydroxyl functionality greater than 2 and a number average molecular weight of 150 to 500 gram/mole; and (iii) 40 to 80 percent by weight, such as 50 to 70 percent by weight, based on the total weight of the isocyanate-reactive composition, of a polyether polyol having a functionality of 3 and a number average molecular weight of 600 to 800 gram/mole, wherein the polyether tetrol (i) and the polyether polyol prepared from an initiator which is not an amine (ii) are present in the isocyanate-reactive composition in a relative weight ratio of 2:1 to 4:1.

Embodiment 35. The process of Embodiment 34, wherein the polyurethane elastomer is an end member of a filter cartridge assembly comprising the end member and a body comprising a filter medium, wherein the process comprises affixing the end member to an end of the body.

Embodiment 36. The process of Embodiment 35, wherein the filter medium is a pleated material, such as a spun bonded polyester, polypropylene or cotton.

Embodiment 37. The process of one or more of Embodiment 35 to Embodiment 36, wherein the body has a generally cylindrical structure and/or the end member is generally circular.

Embodiment 38. The process of one or more of Embodiment 35 to Embodiment 37, wherein an end of the filter medium is immersed into the non-foaming reaction mixture that is deposited in the mold until the reaction mixture hardens about the end of the filter medium.

Embodiment 39. The process of one or more of Embodiment 34 to Embodiment 38, wherein the organic polyisocyanate prepolymer with an internal mold release agent comprises a reaction product of a fatty acid ester and an organic polyisocyanate, such as a fatty acid ester in which at least one aliphatic acid which contains more than 8 carbon atoms is built into the molecule and which has an acid number of between 0 and 100, such as between 0 and 40, and a hydroxyl number between 0 and 150, such as between 0 and 75, with at least one of the acid number and hydroxyl number being greater than 0.

Embodiment 40. The process of Embodiment 39, wherein the fatty acid ester has a number average molecular weight of 500 to 5000 grams/mole, such as 800 to 3000 grams/mole.

Embodiment 41. The process of one or more of Embodiment 39 to Embodiment 40, wherein the fatty acid ester is a condensate of oleic acid with a dicarboxylic acid, such as adipic acid, and a polyfunctional alcohol, such as pentaerythritol, and has a number average molecular weight of 900 to 2500 gram/mole, a hydroxyl number of 30 to 70 mg KOH/gram, and/or an acid number of 3 to 30 determined according to DIN EN ISO 2114 (June 2002).

Embodiment 42. The process of one or more of Embodiment 39 to Embodiment 41, wherein the organic polyisocyanate used for the reaction with the fatty acid ester to make the organic polyisocyanate prepolymer with an internal mold release agent comprises ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, hexahydrotolylene-2,4-diisocyanate, hexahydrotolylene-2,6-diisocyanate, hexahydrophenylene-1,3-diisocyanate, hexahydrophenylene-1,4-diisocyanate, perhydrodiphenylmethane-1,4'-diisocyanate, perhydrodiphenylmethane-4,4'-diisocyanate, phenylene-1,3-diisocyanate, phenylene-1,4-diisocyanate, tolylene-2,4-diisocyanate, tolylene-2,6-diisocyanate, diphenylmethane-2,4'-diisocyanate, diphenylmethane-4,4'-diisocyanate, naphthylene-1,5-diisocyanate, triphenylmethane-4,4',4''-triisocyanate, a polyphenyl-polymethylene polyisocyanate obtained by aniline-formaldehyde condensation followed by phosgenation, a polyisocyanate which contains carbodiimide groups, a polyisocyanate which contains allophanate groups, a polyisocyanate which contains isocyanurate groups, a polyisocyanate which contains urethane groups, a polyisocyanate which contains acylated urea groups, a polyisocyanate which contains biuret groups, a polyisocyanate which contains ester groups; or any mixture of two or more of any of the foregoing.

Embodiment 43. The process of one or more of Embodiment 39 to Embodiment 42, wherein fatty acid ester and the polyisocyanate are reacted in amounts such that the molar ratio of active hydrogen atoms to isocyanate groups is from 1:1 to 1:25. Embodiment 44. The process of one or more of Embodiment 39 to Embodiment 43, wherein a mixture of 0.5 to 50% by weight, such as 1 to 35% by weight, of fatty acid ester and 99.5 to 50% by weight, such as 99 to 65% by weight, of polyisocyanate (the weight percents being based on the total weight of fatty acid ester and polyisocyanate) are reacted, such as where the quantity of fatty acid ester used is from 0.5 to 25% by weight, such as 2 to 18% by weight, based on the total weight of polyisocyanate.

Embodiment 45. The process of one or more of Embodiment 34 to Embodiment 44, wherein the alkylene diamine-alkylene oxide adduct has a number average molecular weight of 300 to 400 gram/mole, such as 340 to 380 gram/mole, and/or has a hydroxyl number of 600 to 660 mg KOH/g.

Embodiment 46. The process of one or more of Embodiment 34 to Embodiment 45, wherein the alkylene diamine-alkylene oxide adduct is present in an amount of 2% to 6% by weight, based on the total weight of isocyanate-reactive ingredients in the isocyanate-reactive composition.

Embodiment 47. The process of one or more of Embodiment 34 to Embodiment 46, wherein the alkylene diamine used to prepare the alkylene diamine-alkylene oxide adduct comprises ethylene diamine.

Embodiment 48. The process of one or more of Embodiment 34 to Embodiment 47, wherein the alkylene oxide used to prepare the alkylene diamine-alkylene oxide adduct comprises ethylene oxide and/or propylene oxide.

Embodiment 49. The process of one or more of Embodiment 34 to Embodiment 48, wherein the alkylene diamine-alkylene oxide adduct is a reaction product of one mole of the diamine with from 4 to 12 moles, such as 4 to 6 moles, or 4 or 5 moles, of the alkylene oxide.

Embodiment 50. The process of one or more of Embodiment 34 to Embodiment 49, wherein the polyether polyol prepared from an initiator which is not an amine has a hydroxyl functionality of 3 or more, such as 3 to 4, or 3, and/or a number average molecular weight of 150 to 450 gram/mole, such as 240 to 300 gram/mole, such as those having a functionality of 3 and a hydroxyl number of 350 to 660 mg KOH/g, such as 600 to 660 mg KOH/g or 640 to 660 mg KOH/g.

Embodiment 51. The process of one or more of Embodiment 34 to Embodiment 50, wherein the combined weight of the polyether polyol prepared from an initiator which is not an amine and the alkylene diamine-alkylene oxide adduct in the isocyanate-reactive composition is at least 10 percent by weight, such as 10 to 20 percent by weight, based on the total weight of the isocyanate-reactive composition.

Embodiment 52. The process of one or more of Embodiment 34 to Embodiment 51, wherein the polyurethane elastomer has a Shore D hardness measured within 10 minutes after production that is at least 60% of the Shore D hardness of the polyurethane elastomer measured 16 hours after production, such as where the elastomer has a Shore D hardness of at least 80 measured 16 hours after production and the Shore D hardness within 10 minutes after production is at least 80% of the Shore D hardness of the polyurethane elastomer measured 16 hours after production.

Embodiment 53. The process of one or more of Embodiment 34 to Embodiment 52, wherein the isocyanate-reactive composition has an average hydroxyl number of greater than 500, in some cases greater than 550, or greater than 600, and no more than 1000, no more than 800 or no more than 700.

Embodiment 54. The process of one or more of Embodiment 34 to Embodiment 53, wherein the isocyanate-reactive composition comprises less than 0.1% by weight, such as less than 0.05% by weight, or 0% by weight, of carboxylic acid.

Embodiment 55. The process of one or more of Embodiment 34 to Embodiment 54, wherein the isocyanate-reactive composition comprises less than 0.5% by weight, such as less than 0.1% by weight, or 0% by weight, of zinc carboxylate, such as a zinc carboxylate containing from 8 to 24 carbon atoms per carboxylate group.

Embodiment 56. The process of one or more of Embodiment 34 to Embodiment 55, wherein the isocyanate-reactive composition comprises less than 2% by weight, such as less than 1% by weight, or 0% by weight, of fatty acid.

Embodiment 57. The process of one or more of Embodiment 34 to Embodiment 56, wherein the reaction mixture comprises less than 0.5% by weight, such as less than 0.1% by weight, or 0% by weight, of a peralkylated polyalkylene polyamine.

Embodiment 58. The process of one or more of Embodiment 34 to Embodiment 57, wherein the isocyanate-reactive composition does not include a polyether having at least two isocyanate-reactive groups and a molecular weight of 1800 to 12,000 in which at least 50% of the isocyanate-reactive groups are primary amine and/or secondary amino groups.

Embodiment 59. The process of one or more of Embodiment 34 to Embodiment 58, wherein the isocyanate-reactive composition comprises less than 5% by weight, such as less than 1% by weight, or 0% by weight, of a chain extender comprising a sterically hindered aromatic diamine.

Embodiment 60. The process of one or more of Embodiment 34 to Embodiment 59, wherein the isocyanate-reactive composition comprises a filler, such as talc, calcium carbonate, barium sulfate, fumed or precipitated silica, quartz flour, diatomaceous earth, alumina trihydrate, titanium dioxide, and mixtures of two or more of any of the foregoing, such as any of these where the filler is present in an amount of 5 to 50% by weight, such as 10 to 40% by weight or 15 to 30% by weight, based on the total weight of the isocyanate-reactive composition.

Embodiment 61. The process of one or more of Embodiment 34 to Embodiment 60, wherein the isocyanate-reactive composition does not include an internal mold release agent.

Embodiment 62. The process of one or more of Embodiment 34 to Embodiment 61, wherein the isocyanate-reactive composition further comprises a catalyst, such as a tertiary amine, such as triethylamine, tributylamine, N-methylmorpholine, N-ethylmorpholine, N-cocomorpholine, N,N,N',N''-tetramethylethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butane diamine, N,N-dimethyl-phenylethylamine, 1,2-dimethylimidazole and/or 2-methylimidazole, and/or an organometallic compound, such as an organotin compound, such as tin-(II)-salts of carboxylic acids, such as tin-(II)-acetate, tin-(II)-octoate, tin-(II)-ethylhexoate and tin-(II)-laurate and the dialkyl tin salts of carboxylic acids, such as dibutyl tin diacetate, dibutyl tin dilaurate, dibutyl tin maleate or dioctyl tin diacetate, including where the catalyst is included in the isocyanate-reactive composition in an amount of from 0.01 to 5 parts by weight, such as from 0.02 to 1 parts by weight, based on total weight of the polyol in the isocyanate-reactive composition.

Embodiment 63. The process of one or more of Embodiment 34 to Embodiment 62 wherein the isocyanate functional component and the isocyanate-reactive composition are mixed at an isocyanate index of from 90 to 140, such as 100 to 120.

Embodiment 64. A process of making a filter cartridge assembly comprising an end member and a body comprising a filter medium, comprising affixing the end member to an end of the body, wherein the end member is a polyurethane elastomer that is a reaction product of a non-foaming reaction mixture comprising an isocyanate-reactive composition and an organic polyisocyanate prepolymer having an internal mold release agent, wherein the isocyanate-reactive composition comprises a mixture of polyols formulated to provide a polyurethane elastomer having a Shore D hardness, measured according to ASTM D2240-15, within 10 minutes after production that is at least 60% of the Shore D hardness of the polyurethane elastomer measured 16 hours after production.

Embodiment 65. The process of Embodiment 64, wherein the filter medium is a pleated material, such as a spun bonded polyester, polypropylene or cotton.

Embodiment 66. The process of one or more of Embodiment 64 to Embodiment 65, wherein the body has a generally cylindrical structure and/or the end member is generally circular.

Embodiment 67. The process of one or more of Embodiment 64 to Embodiment 66, wherein the affixing comprises depositing the non-foaming reaction mixture into a mold, such as by a one-shot technique in which the organic polyisocyanate prepolymer and the isocyanate-reactive composition are separately supplied to a mixhead, where they are mixed, and the mixture is then injected into a mold and an end of the filter medium is immersed into the non-foaming reaction mixture that is deposited in the mold until the reaction mixture hardens about the end of the filter medium.

Embodiment 68. The process of one or more of Embodiment 64 to Embodiment 67, wherein the organic polyisocyanate prepolymer with an internal mold release agent comprises a reaction product of a fatty acid ester and an organic polyisocyanate, such as a fatty acid ester in which at least one aliphatic acid which contains more than 8 carbon atoms is built into the molecule and which has an acid number of between 0 and 100, such as between 0 and 40, and a hydroxyl number between 0 and 150, such as between 0 and 75, with at least one of the acid number and hydroxyl number being greater than 0.

Embodiment 69. The process of Embodiment 68, wherein the fatty acid ester has a number average molecular weight of 500 to 5000 grams/mole, such as 800 to 3000 grams/mole.

Embodiment 70. The process of one or more of Embodiment 68 to Embodiment 69, wherein the fatty acid ester is a condensate of oleic acid with a dicarboxylic acid, such as adipic acid, and a polyfunctional alcohol, such as pentaerythritol, and has a number average molecular weight of 900 to 2500 gram/mole, a hydroxyl number of 30 to 70 mg KOH/gram, and/or an acid number of 3 to 30 determined according to DIN EN ISO 2114 (June 2002).

Embodiment 71. The process of one or more of Embodiment 68 to Embodiment 70, wherein the organic polyisocyanate used for the reaction with the fatty acid ester to make the organic polyisocyanate prepolymer with an internal mold release agent comprises ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, hexahydrotolylene-2,4-diisocyanate, hexahydrotolylene-2,6-diisocyanate, hexahydrophenylene-1,3-diisocyanate, hexahydrophenylene-1,4-diisocyanate, perhydrodiphenylmethane-1,4'-diisocyanate, perhydrodiphenylmethane-4,4'-diisocyanate, phenylene-1,3-diisocyanate, phenylene-1,4-diisocyanate, tolylene-2,4-diisocyanate, tolylene-2,6-diisocyanate, diphenylmethane-2,4'-diisocyanate, diphenylmethane-4,4'-diisocyanate, naphthylene-1,5-diisocyanate, triphenylmethane-4,4',4"-triisocyanate, a polyphenyl-polymethylene polyisocyanate obtained by aniline-formaldehyde condensation followed by phosgenation, a polyisocyanate which contains carbodiimide groups, a polyisocyanate which contains allophanate groups, a polyisocyanate which contains isocyanurate groups, a polyisocyanate which contains urethane groups, a polyisocyanate which contains acylated urea groups, a polyisocyanate which contains biuret groups, a polyisocyanate which contains ester groups; or any mixture of two or more of any of the foregoing.

Embodiment 72. The process of one or more of Embodiment 68 to Embodiment 71, wherein fatty acid ester and the polyisocyanate are reacted in amounts such that the molar ratio of active hydrogen atoms to isocyanate groups is from 1:1 to 1:25.

Embodiment 73. The process of one or more of Embodiment 68 to Embodiment 72, wherein a mixture of 0.5 to 50% by weight, such as 1 to 35% by weight, of fatty acid ester and 99.5 to 50% by weight, such as 99 to 65% by weight, of polyisocyanate (the weight percents being based on the total weight of fatty acid ester and polyisocyanate) are reacted, such as where the quantity of fatty acid ester used is from 0.5 to 25% by weight, such as 2 to 18% by weight, based on the total weight of polyisocyanate.

Embodiment 74. The process of one or more of Embodiment 64 to Embodiment 73, wherein the isocyanate-reactive composition comprises 1% to 10% by weight, such as 2% to 6% by weight, based on the total weight of isocyanate-reactive ingredients in the isocyanate-reactive composition, of a polyether tetrol that is an alkylene diamine-alkylene oxide adduct having a number average molecular weight of 150 to 500 gram/mole, such as 300 to 400 gram/mole, such as 340 to 380 gram/mole, and/or has a hydroxyl number of 600 to 660 mg KOH/g.

Embodiment 75. The process of Embodiment 74, wherein the alkylene diamine used to prepare the alkylene diamine-alkylene oxide adduct comprises ethylene diamine.

Embodiment 76. The process of one or more of Embodiment 74 to Embodiment 75, wherein the alkylene oxide used to prepare the alkylene diamine-alkylene oxide adduct comprises ethylene oxide and/or propylene oxide.

Embodiment 77. The process of one or more of Embodiment 74 to Embodiment 76, wherein the alkylene diamine-alkylene oxide adduct is a reaction product of one mole of the diamine with from 4 to 12 moles, such as 4 to 6 moles, or 4 or 5 moles, of the alkylene oxide.

Embodiment 78. The process of one or more of Embodiment 64 to Embodiment 77, wherein the isocyanate-reactive composition further comprises a polyether polyol prepared from an initiator which is not an amine that has a hydroxyl functionality of greater than 2, such as 3 or more, such as 3 to 4, or 3, and a number average molecular weight of 150 to 500 gram/mole, such as 150 to 450 gram/mole, such as 240 to 300 gram/mole, such as those having a functionality of 3 and a hydroxyl number of 350 to 660 mg KOH/g, such as 600 to 660 mg KOH/g or 640 to 660 mg KOH/g.

Embodiment 79. The process of Embodiment 78, wherein the polyether polyol prepared from an initiator which is not an amine (A) and the alkylene diamine-alkylene oxide adduct (B) are present in the isocyanate-reactive composition in a relative ratio, by weight of (A):(B), of at least 1:1, such as at least 2:1 or, in some cases, 2:1 to 4:1.

Embodiment 80. The process of Embodiment 78 or Embodiment 79, wherein the combined weight of the polyether polyol prepared from an initiator which is not an amine and the alkylene diamine-alkylene oxide adduct in the isocyanate-reactive composition is at least 10 percent by weight, such as 10 to 20 percent by weight, based on the total weight of the isocyanate-reactive composition.

Embodiment 81. The process of one or more of Embodiment 64 to Embodiment 80, wherein the isocyanate-reactive composition further comprises a polyether polyol having a hydroxyl functionality of at least 2, such as greater than 2, and a number average molecular weight of from above 500 gram/mole to below 2000 gram/mole, such as from 600 gram/mole to 800 gram/mole.

Embodiment 82. The process of Embodiment 81, wherein the polyether polyol having a hydroxyl functionality of at least 2 and a number average molecular weight of from above 500 to below 2000 gram/mole is present in an amount of 40 to 80 percent by weight, such as 50 to 70 percent by weight, based on the total weight of the isocyanate-reactive composition.

Embodiment 83. The process of one or more of Embodiment 64 to Embodiment 82, wherein the isocyanate-reactive composition comprises a blend of polyols that comprises (i) 60 to 90% by weight, such as 70 to 90% by weight, such as 75 to 85% by weight, of polyol(s) having a hydroxyl functionality of at least 2, such as greater than 2, and a number average molecular weight of from above 500 to below 2000 gram/mole; and (ii) 10 to 40% by weight, such as 15 to 25% by weight, of polyol(s) having a hydroxyl functionality of greater than 2 and a number average molecular weight of 150 to 500 gram/mole, such weight percents being based on the total weight of polyols in the isocyanate-reactive composition.

Embodiment 84. The process of one or more of Embodiment 64 to Embodiment 83, wherein the elastomer has a Shore D hardness of at least 80 measured 16 hours after production and the Shore D hardness within 10 minutes after production is at least 80% of the Shore D hardness of the polyurethane elastomer measured 16 hours after production.

Embodiment 85. The process of one or more of Embodiment 64 to Embodiment 84, wherein the isocyanate-reactive composition has an average hydroxyl number of greater than 500, in some cases greater than 550, or greater than 600, and no more than 1000, no more than 800 or no more than 700.

Embodiment 86. The process of one or more of Embodiment 64 to Embodiment 85, wherein the isocyanate-reactive composition comprises less than 0.1% by weight, such as less than 0.05% by weight, or 0% by weight, of carboxylic acid.

Embodiment 87. The process of one or more of Embodiment 64 to Embodiment 86, wherein the isocyanate-reactive composition comprises less than 0.5% by weight, such as less than 0.1% by weight, or 0% by weight, of zinc carboxylate, such as a zinc carboxylate containing from 8 to 24 carbon atoms per carboxylate group.

Embodiment 88. The process of one or more of Embodiment 64 to Embodiment 87, wherein the isocyanate-reactive composition comprises less than 2% by weight, such as less than 1% by weight, or 0% by weight, of fatty acid.

Embodiment 89. The process of one or more of Embodiment 64 to Embodiment 88, wherein the reaction mixture comprises less than 0.5% by weight, such as less than 0.1% by weight, or 0% by weight, of a peralkylated polyalkylene polyamine.

Embodiment 90. The process of one or more of Embodiment 64 to Embodiment 89, wherein the isocyanate-reactive composition does not include a polyether having at least two isocyanate-reactive groups and a molecular weight of 1800 to 12,000 in which at least 50% of the isocyanate-reactive groups are primary amine and/or secondary amino groups.

Embodiment 91. The process of one or more of Embodiment 64 to Embodiment 90, wherein the isocyanate-reactive composition comprises less than 5% by weight, such as less than 1% by weight, or 0% by weight, of a chain extender comprising a sterically hindered aromatic diamine.

Embodiment 92. The process of one or more of Embodiment 64 to Embodiment 91, wherein the isocyanate-reactive composition comprises a filler, such as talc, calcium carbonate, barium sulfate, fumed or precipitated silica, quartz flour, diatomaceous earth, alumina trihydrate, titanium dioxide, and mixtures of two or more of any of the foregoing, such as any of these where the filler is present in an amount of 5 to 50% by weight, such as 10 to 40% by weight or 15 to 30% by weight, based on the total weight of the isocyanate-reactive composition.

Embodiment 93. The process of one or more of Embodiment 64 to Embodiment 92, wherein the isocyanate-reactive composition does not include an internal mold release agent.

Embodiment 94. The process of one or more of Embodiment 64 to Embodiment 93, wherein the isocyanate-reactive composition further comprises a catalyst, such as a tertiary amine, such as triethylamine, tributylamine, N-methylmorpholine, N-ethylmorpholine, N-cocomorpholine, N,N,N',N"-tetramethylethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butane diamine, N,N-dimethyl-phenylethylamine, 1,2-dimethylimidazole and/or 2-methylimidazole, and/or an organometallic compound, such as an organotin compound, such as tin-(II)-salts of carboxylic acids, such as tin-(II)-acetate, tin-(II)-octoate, tin-(II)-ethylhexoate and tin-(II)-laurate and the dialkyl tin salts of carboxylic acids, such as dibutyl tin diacetate, dibutyl tin dilaurate, dibutyl tin maleate or dioctyl tin diacetate, including where the catalyst is included in the isocyanate-reactive composition in an amount of from 0.01 to 5 parts by weight, such as from 0.02 to 1 parts by weight, based on total weight of the polyol in the isocyanate-reactive composition.

Embodiment 95. The process of one or more of Embodiment 64 to Embodiment 94 wherein the isocyanate functional component and the isocyanate-reactive composition are mixed at an isocyanate index of from 90 to 140, such as 100 to 120.

The non-limiting and non-exhaustive examples that follow are intended to further describe various non-limiting and non-exhaustive embodiments without restricting the scope of the embodiments described in this specification.

EXAMPLES

All quantities given in "parts" and "percents" are understood to be by weight, unless otherwise indicated. The following materials were used in the formulations of the examples:

POLYOL A: A 700 molecular weight polypropylene oxide-based triol; functionality 3; hydroxyl number 233 to 243 mg KOH/g; viscosity of 250 cps @ 25° C.

POLYOL B: A 260 molecular weight polypropylene oxide-based triol; functionality 3; hydroxyl number 640 to 660 mg KOH/g; viscosity of 820 cps @ 25° C.

POLYOL C: An amine initiated polyether polyol; functionality of 4; hydroxyl number of 600 to 660 mg KOH/g; molecular weight 360; viscosity of 16,000 to 20,000 mPa·s @ 25° C.

POLYOL D: A bifunctional polyether polyol; hydroxyl number of 107.4 to 115.4 mg KOH/g; molecular weight 1000; viscosity of 135 to 175 mPa·s @ 25° C.

POLYOL E: A bifunctional polyether polyol; hydroxyl number of 54.7 to 57.5 mg KOH/g; molecular weight 2000; viscosity of 325 to 365 mPa·s @ 25° C.

POLYOL F: A 450 molecular weight polypropylene oxide-based triol; functionality 3; hydroxyl number 350 to 390 mg KOH/g; viscosity of 520 to 700 mPa·s @ 25° C.

FILLER 1: Ground calcium carbonate commercially available from Huber Engineered Materials as Hubercarb® Q6.

FILLER 2: Kaolin clay commercially available from BASF as Satintone® SP-33.

PIGMENT 1: Carbon black pigment commercially available from Rockwood Pigments.

PIGMENT 2: Blue pigment commercially available from Polyone Corp. (Stan-Tone HCC33598 Blue).

BYK 410: Rheology additive commercially available from BYK Alatana Group

DABCO T-12: Tin catalyst commercially available from Air Products & Chemicals

UOP L: moisture scavenger—a potassium calcium sodium aluminosilicate of the zeolite A type commercially available from A.B. Colby, Inc.

ISO A: an MDI based organic polyisocyanate prepolymer (28.5% NCO content) that is the reaction product of a fatty acid ester and MDI, prepared according to the general description in U.S. Pat. No. 4,201,847 at col. 8, line 30 to col. 10, line 11, the cited portion of which being incorporated herein by reference.

ISO B: An aromatic isocyanate prepolymer, 23.1% NCO, containing 50-60% by weight 4,4'-diphenylmethane diisocyanate, 20-30% by weight MDI homopolymer, 15-25% by weight polyurethane prepolymer, and 1-5% by weight MDI mixed isomers ISO C: Mondur® MR5 (a polymeric MDI (pMDI) containing a relatively high level of MDI, NCO content of 32.1%).

The plaques produced in the Examples which follow were produced by the following procedure: A total of 120 grams of the isocyanate/polyol mixture were combined in a suitable container with mixing, in which the amounts of the components were determined based upon the weight ratio listed in Table 1. The 120 grams of material was placed in a Hauschild mixer and mixed for 30 seconds. After mixing, the material was poured into a mold that was maintained at 150° F. The mold produced a plaque measuring 150 mm wide×150 mm long×3 mm thick. Prior to molding the mold surface was treated with a light spray of Chem Trend® MR515 silicone release agent and then buffed with a dry, clean cloth. The resultant plaque was allowed to cure for 4 minutes prior to demolding.

TABLE 1

| | Example # | | | | | | |
|---|---|---|---|---|---|---|---|
| | 1 | 2 | 3 | 4 | 5 | 6 | 7 |
| POLYOL A | 63.63 | 63.63 | 60.6 | — | — | — | — |
| POLYOL B | 11.11 | 11.11 | 10.58 | — | — | — | — |
| POLYOL C | — | — | 3.81 | — | — | 3.5 | 2.0 |
| POLYOL D | — | — | — | 29.8 | 29.8 | 28.8 | 28.8 |
| POLYOL E | — | — | — | 29.8 | 29.8 | 28.8 | 28.8 |
| POLYOL F | — | — | — | 30.75 | 30.75 | 29.25 | 30.75 |
| ETHYLENE GLYCOL | — | — | — | 5.0 | 5.0 | 5.0 | 5.0 |
| BYK 410 | 0.10 | 0.10 | 0.10 | — | — | — | — |
| DABCO T-12 | 0.03 | 0.03 | 0.03 | 0.05 | 0.05 | 0.05 | 0.05 |
| PIGMENT 1 | 0.51 | 0.51 | 0.51 | — | — | — | — |
| PIGMENT 2 | — | — | — | 0.80 | 0.80 | 0.80 | 0.80 |
| UOP L | 2.02 | 2.02 | 1.92 | 3.6 | 3.6 | 3.6 | 3.6 |
| FILLER 1 | 12.12 | 12.12 | 11.54 | — | — | — | — |
| FILLER 2 | 11.48 | 11.48 | 10.94 | — | — | — | — |
| ISO A | — | X | X | — | X | X | X |
| ISO B | X | — | — | — | — | — | — |
| ISO C | — | — | — | X | — | — | — |
| Mix Ratio (pbw) Isocyanate:Polyol | 75:100 | 61:100 | 67:100 | 62:100 | 71:100 | 75:100 | 73.8:100 |
| No. of releases[1] | 1-2 | >20 | >20 | 1-2 | >20 | >20 | >20 |
| Shore D Hardness[2] | | | | | | | |
| @ de-mold | 25 | 21 | 24 | 20 | 12 | 17 | 15 |
| 5 min. after de-mold | 75 | 43 | 72 | 35 | 17 | 41 | 35 |
| 1 hr. after de-mold | 81 | 72 | 80 | 63 | 42 | 62 | 53 |
| Final Shore D Hardness (16 hours after production) | 82 | 77 | 82 | 66 | 51 | 67 | 63 |

[1]The number of release means the number of times that the plaque could be removed from the mold before experiencing undue resistance and/or leaving polyurethane residue behind.
[2]Shore D hardness is measured according to ASTM D2240-15

As can be seen from the data presented in Table 1, substitution of ISO A into the compositions produced plaques that exhibited significantly more releases from the mold relative to ISO B and ISO C. In fact, the increase in number of releases was far more than was expected. Initially it was expected that the number of releases would increase from 1-2 to approximately 10-12 by this substitution. What was observed, however, was at least a two-fold greater number of releases than what was expected.

As can also been seen from the data presented in Table 1, mere substitution of isocyanates as described above in the polyurethane-forming system did not produce a composite with acceptable physical properties. After numerous attempts to achieve a desired cure profile through catalyst modifications, which were not successful, it was discovered that it was critical to modify the isocyanate-reactive mixture by including a sufficient amount of POLYOL C to provide a plaque with an adequate cure profile for production as is illustrated by the Shore D hardness build over time.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a molded polyurethane elastomer, comprising depositing a non-foaming reaction mixture into a mold, the non-foaming reaction mixture comprising:
    (a) an organic polyisocyanate prepolymer having an internal mold release agent; and
    (b) an isocyanate-reactive composition comprising:
        (i) 1% to 10% by weight, based on the total weight of isocyanate-reactive ingredients in the isocyanate-reactive composition, of a polyether tetrol that is an alkylene diamine-alkylene oxide adduct having a number average molecular weight of 150 to 500 gram/mole;
        (ii) a polyether polyol that has a hydroxyl functionality greater than 2 and a number average molecular weight of 150 to 500 gram/mole, wherein the polyether polyol is prepared from an initiator which is not an amine; and
        (iii) 40 to 80 percent by weight, based on the total weight of the isocyanate-reactive composition, of a polyether polyol having a functionality of 3 and a number average molecular weight of 600 to 800 gram/mole,
        wherein the polyether tetrol (i) and the polyether polyol prepared from an initiator which is not an amine (ii) are present in the isocyanate-reactive composition in a relative weight ratio of 2:1 to 4:1.

2. The process of claim 1, wherein the organic polyisocyanate prepolymer comprises a reaction product of a fatty acid ester and an organic polyisocyanate.

3. The process of claim 2, wherein the fatty acid ester is a condensate of oleic acid with a dicarboxylic acid and a polyfunctional alcohol that has a number average molecular weight of 900 to 2500 gram/mole and a hydroxyl number of 30 to 70 mg KOH/gram.

4. The process of claim 1, wherein the polyether tetrol has a number average molecular weight 340 to 380 gram/mole.

5. The process of claim 1, wherein the polyether tetrol is present in an amount of 2% to 6% by weight, based on the total weight of isocyanate-reactive ingredients in the isocyanate-reactive composition.

6. The process of claim 1, wherein the polyether polyol prepared from an initiator which is not an amine has a functionality of 3 and a hydroxyl number of 640 to 660 mg KOH/g.

7. The process of claim 1, wherein the isocyanate-reactive composition comprises less than 0.1% by weight of carboxylic acid.

8. The process of claim 1, wherein the isocyanate-reactive composition comprises less than 0.5% by weight of zinc carboxylate.

9. The process of claim 1, wherein the isocyanate-reactive composition does not include an internal mold release agent.

* * * * *